United States Patent [19]

Sittnick, Jr. et al.

[11] Patent Number: 4,763,937

[45] Date of Patent: Aug. 16, 1988

[54] ELECTROMAGNETIC DOOR LOCK SYSTEM

[76] Inventors: Ralph A. Sittnick, Jr., 86 Bishop Ave., Southington, Conn. 06489; Roy A. Mathers, 9 Cardinal Dr., Farmington, Conn. 06032

[21] Appl. No.: 906,168

[22] Filed: Sep. 11, 1986

[51] Int. Cl.⁴ .............................................. E05C 17/56
[52] U.S. Cl. .................................. 292/251.5; 49/25; 49/31; 70/277; 292/92; 340/542; 361/170
[58] Field of Search ............... 292/251.5, 92, DIG. 65; 70/92, 277, 279; 49/25, 31; 361/170, 179, 182; 340/542

[56] References Cited

U.S. PATENT DOCUMENTS

| | | | |
|---|---|---|---|
| 2,601,775 | 7/1952 | Jewett et al. | 70/451 |
| 3,126,218 | 3/1964 | Andrews | 70/432 |
| 4,034,437 | 7/1977 | Robertson et al. | 49/31 X |
| 4,080,594 | 3/1978 | Plevy | 340/542 |
| 4,123,748 | 10/1978 | Otani | 367/93 |
| 4,257,631 | 3/1981 | Logan | 292/251.5 |
| 4,639,902 | 1/1987 | Leverance et al. | 367/93 |
| 4,652,028 | 3/1987 | Logan et al. | 292/251.5 |
| 4,652,862 | 3/1987 | Verslycken | 292/92 X |

Primary Examiner—Lloyd A. Gall
Attorney, Agent, or Firm—Chilton, Alix & Van Kirk

[57] ABSTRACT

An electromagnetic door lock system employs an electromagnetic lock which magnetically bonds with an armature plate. An acoustical sensor generates a detection beam. The detection beam is directed toward the doorknob. Reflected energy is received and electronically processed to detect the presence of a foreign object in the vicinity of the doorknob. The lock automatically deactuates when a foreign object is detected in the vicinity of the knob. The electromagnetic lock, sensor and processing circuitry are mounted in a housing which is located near the top of a doorway. An audio alarm and status light indicators are mounted at the housing to indicate the status of the lock.

28 Claims, 8 Drawing Sheets

ELECTROMAGNETIC DOOR LOCK SYSTEM

BACKGROUND OF THE INVENTION

This invention relates to a new and improved electromagnetic lock system for providing controlled access through a doorway by means of an electromagnetic lock. More particularly, this invention relates to a lock system wherein controlled access through a doorway is accomplished by means of an automatic electronic control system.

Electromagnetic locks which function to magnetically bond a door to the doorframe have proved very advantageous in satisfying both security and safety requirements and in providing efficient and reliable means for remote control and monitoring of an integrated multi-lock system. Electromagnetic locks have effectively eliminated the numerous disadvantages of the mechanical lock system such as mechanical failure or mechanical wear in the form of return spring breakage, bolt side loading or binding, and other mechanical malfunctions which may result in a lock system which is either ineffective for normal usage or non-functional in emergency situations. The electromagnetic lock provides many additional advantages such as centralized control and monitoring, ease of installation, and ease of maintenance due to the absence of moving parts.

The present invention is particularly adaptable for use in providing controlled access through one or more emergency doors such as, for example, a multiplicity of stairwell doors in a multi-story structure. Security requirements and building and fire-code regulations combine to define critical—and often conflicting—design constraints for any lock system which is to be employed for controlling access through emergency doors. From the security perspective, the function of the lock system is to prevent unauthorized entry through the doorway while controllably permitting egress through the doorway. In many applications such as secured institutions, it is critical that the lock system control authorized egress and discriminate against unauthorized egress. From the safety perspective, in the event of an emergency condition such as a fire, it is critical that egress through the doorway be easily accomplished in a prompt manner in which no special knowledge is required to unlock or disable the lock system. It is also critical that the door remain latched in a closed position in the absence of egress to prevent fire, water or smoke migration into the building core.

The use of centralized supervisory remote control and remote monitoring of multiple lock systems has become commonplace as a means for enhancing the security provided by multi-lock systems. Strict adherence to security and safety standards requires that the control and monitor functions be resourcefully allocated and coordinated between the local electromagnetic lock unit and the remote supervisory unit. Integration of the electromagnetic lock unit and the smoke detection system is als highly desirable.

SUMMARY OF THE INVENTION

Briefly stated, the invention in a preferred form is an electromagnetic lock system which is adaptable for providing controlled access through a doorway. A housing, which is preferably of a rectangular form, is adapted for mounting at an upper location of the door frame. An electromagnetic lock is mounted to the housing and selectively electrically energizable to magnetically bond with an armature mounted to the door. A transmitter which is preferably an acoustical transducer is mounted in the housing. The transmitter directs a detection beam toward a target, which is ordinarily the door knob or panic bar, and essentially generates a detection zone in the vicinity of the door knob. A detector which is also preferably the acoustical transducer is mounted in the housing to detect the presence of a foreign object in the detection zone. Upon detection of a foreign object in the detection zone, the electromagnetic lock is automatically disabled or de-energized for a pre-established time interval. The electromagnetic lock system may be operated in a standard mode wherein the lock is disabled immediately after the detection of a foreign object or a delay mode wherein the disabling of the lock is delayed for a pre-established time interval to permit verification that egress is authorized.

Manually operable adjustment means are provided for adjustably fixing the location and dimensions of the detection zone. An audio alarm generates an alarm in the event that a foreign object is detected in the detection zone. The occurrence of the detection of a foreign object in the zone is also automatically recorded. The energization status of the electromagnetic lock is indicated by a light display at the housing. Communication circuitry is provided for transmitting signals indicative of the energization status of the electromagnetic lock to a remote monitoring station and also for receiving input signals from a remote location for controlling the operation of the electromagnetic lock. The operation of the detection circuitry is automatically monitored. The electromagnetic lock is de-energized in the event of a malfunction in the detection circuitry.

The electromagnetic lock is preferably positioned at one side of a substantially rectangular housing. The transmitter is positioned in the lower portion of the housing. A lighted panel in the form of an EXIT sign is mounted at a side opposite the electromagnetic lock. The top of the housing is configured to slidably engage a mounting plate for mounting the housing at the doorway.

The transmitter is pulsed so that the detection beam comprises a series of pulse bursts having a pre-established frequency and number of pulses. Reflected energy is received from the general direction of the target. The received energy is processed into a generally digitized waveform. A clock circuit generates a zone signal having a pre-established time duration and pre-established time relationship with pulses of the detection beam. An identifier circuit identifies waveforms having a pre-established relationship with the transmitted pulse bursts and occurring at a time defined by the zone signal and generates an identification signal indicative thereof. A disabling circuit is responsive to the identification signal for transforming the electromagnetic lock to an unlocked de-energized condition for a pre-established time interval.

A pre-identification circuit comprises a counter for counting the number of pulses in the waveform and a frequency verifier for verifying that the pulse and the waveform occur at a pre-established frequency. The identifier circuit further identifies waveforms having a pre-established relationship between the number and frequency of pulses in the waveform and the transmitted pulse burst. A latching circuit records the occurrence of the transmittal of an identification signal. A safety monitoring circuit is provided for comparing pulses of the waveform with pre-established pulse characteristics and for transforming the electromagnetic lock to an unlock condition in the event that the pulses do not satisfy the pulse characteristics within a pre-established safety time interval.

A method for automatically controlling the operation of an electromagnetic lock in accordance with the present invention comprises generating a detection beam and directing the beam toward a manually operable latch member such as a door knob or panic bar. Reflected energy from the general vicinity of the doorknob is received. A detection zone is formed in the vicinity of the doorknob. The received energy is processed to detect the presence of a foreign object in the detection zone. The electromagnetic lock is automatically disabled in the event of the detection of a foreign object such as a hand reaching for the doorknob.

In accordance with the invention, the received energy is verified to determine whether the energy originated in the transmitted detection beam. The occurrence of a foreign object in the detection zone is automatically recorded. The electromagnetic lock is re-enabled after a pre-established time interval. A status signal indicative of the lock status of the electromagnetic lock is transmitted to a station at a location remote from the door.

An object of the invention is to provide a new and improved electromagnetic door lock system for mounting to an emergency doorway to provide controlled access and egress therethrough.

An object of the invention is to provide a new and improved electromagnetic door lock system for a controlled access doorway which system provides for remote control and monitoring and allows for an efficient and safe egress through the doorway in the event of an emergency condition.

Another object of the invention is to provide a new and improved electromagnetic door lock system for a controlled access doorway which system is automatically transformable to an unlocked condition upon reaching for a panic bar or a doorknob.

Another object of the invention is to provide a new and improved electromagnetic door lock system for a controlled access doorway which system does not require extensive structural modification for installation, is relatively easy to install and is easily and efficiently incorporated into a master system for remote control and monitoring.

A further object of the invention is to provide a new and improved electromagnetic door lock system which is adaptable to accommodate a wide spectrum of building, fire, and safety code regulations and operational objectives.

A further object of the invention is to provide a new and improved electromagnetic door lock system which provides an efficient means for securably locking a doorway to prevent access from one direction while allowing for ease of egress from the other direction and is also safely operable in an emergency condition or upon failure of the electrical power supply or malfunction of the system circuitry or components thereof.

Other objects and advantages of the invention will become apparent from the specification and the drawings.

DETAILED DESCRIPTION OF THE INVENTION

With reference to the drawings wherein like numerals represent like parts throughout the several figures, an electromagnetic door lock system in accordance with the present invention is generally designated by the numeral 10. The door lock system 10 is readily adaptable for incorporation for use in connection with a doorway of any of a number of conventional forms. The lock system is especially adaptable for use with multiple exit stairwell doorways or emergency doorways employed in multi-story or multi-unit structures to provide a security system having centralized remote control and monitoring. The electromagnetic lock system may be readily employed with conventional door latch hardware.

Figure 1:
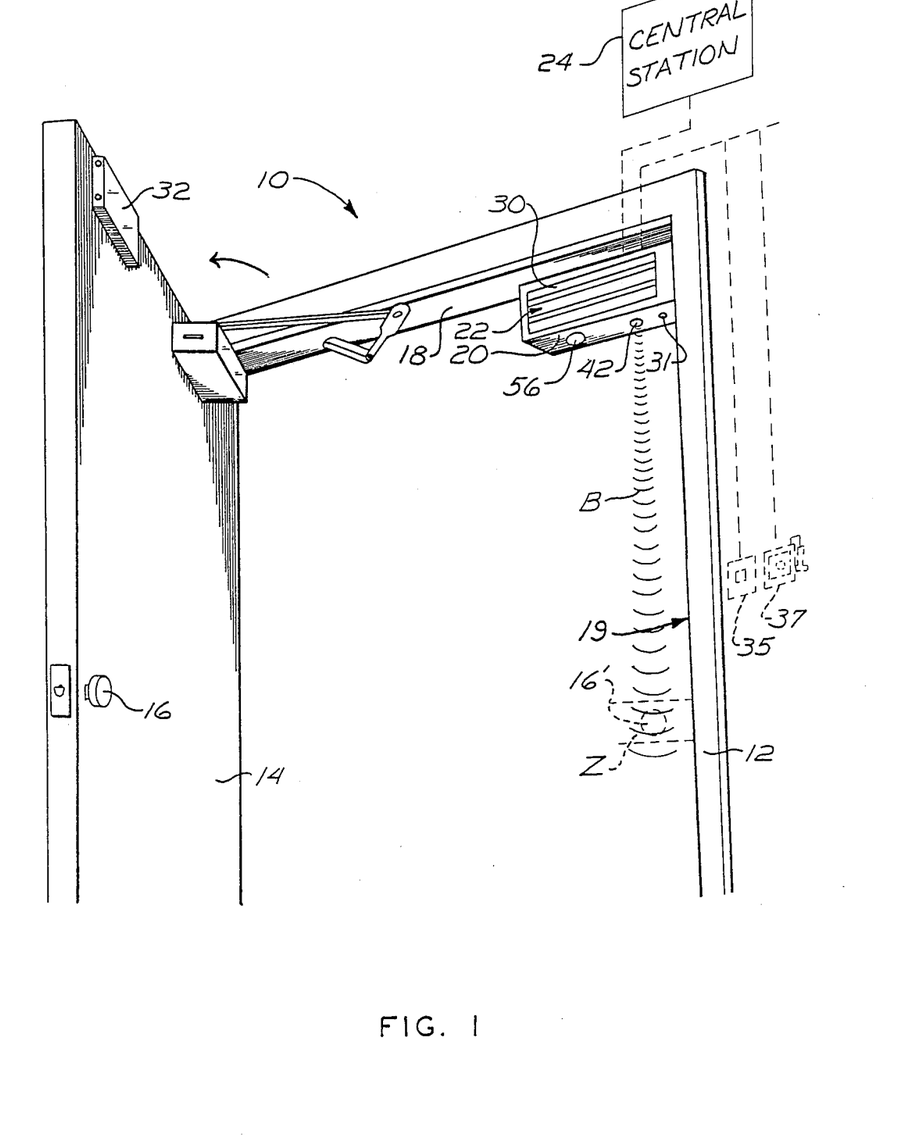
FIG. 1 is a generally front perspective view of an electromagnetic door lock system of the present invention, said system being mounted on the hallway or interior side of an emergency door of a controlled access doorway, portions of the system being illustrated in phantom.

With reference to FIG. 1, a door frame 12 mounts a door 14 which opens in the direction of the arrow to provide egress from an interior secured area. Access to the secured area via the door is restricted by the door lock system 10. Standard egress latch hardware which may be in the form of a door knob 16 for actuating a latch as illustrated, a panic bar (not illustrated) or other conventional form is employed for latching the door in the closed position. The door lock system 10 is not limited to the type of doorway illustrated in the drawing or the specific mount configuration, but is readily adaptable for use with a wide spectrum of door configurations and applications.

Door lock system 10 employs a tamper-resistant housing 20 which compactly houses the electromagnetic lock 22 and most of the system components including the electronic control system illustrated in FIGS. 2A–2D. Preferably, the lock system electrically communicates with a centralized remote supervisory control and monitor station designated generally by the numeral 24. The housing 20 is generally of an elongated rectangular form having a rugged and durable structure and presenting a pleasing external appearance. The housing 20 is mounted to the underside of jamb 18 of the door frame 12 so as to extend in a horizontal orientation. The housing is located at one side of the jamb above the door knob so as to abut against the stile 19.

Figure 3:
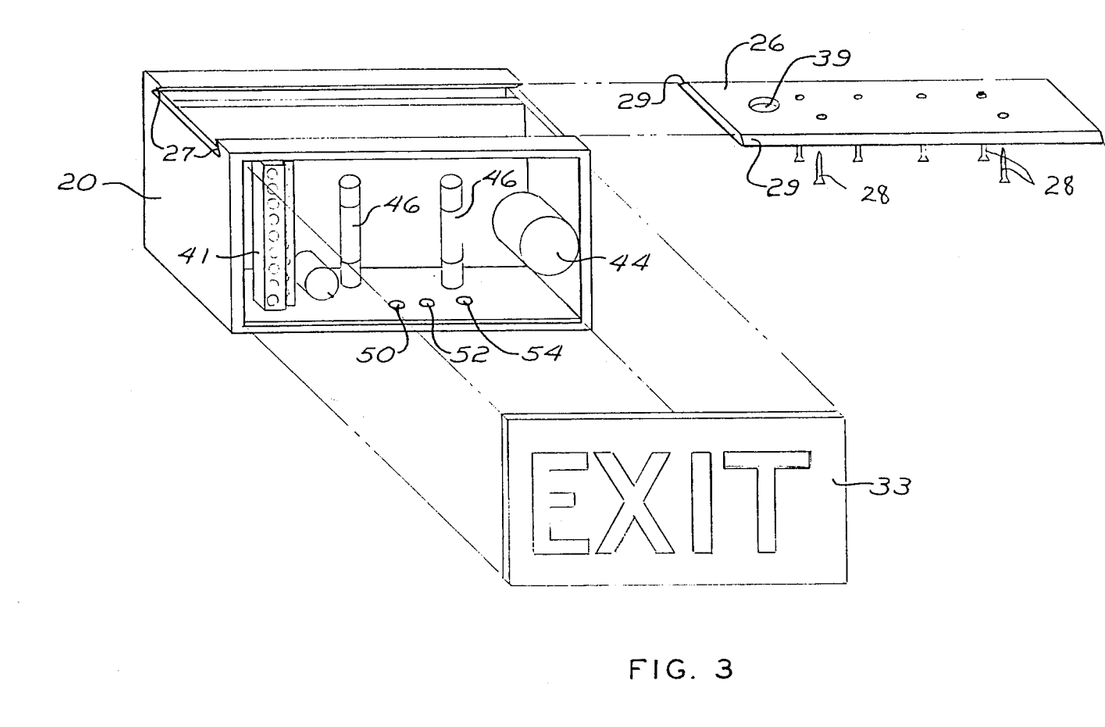
FIG. 3 is an enlarged exploded fragmentary rear view of the electromagnetic lock system of FIG. 1, partially illustrating selected assembled system components.

With additional reference to FIG. 3, in preferred form, the top of the housing 20 forms a longitudinally extending slot defined between a pair of spaced inclined edges 27. A base plate 26 which is dimensioned for close sliding reception in the slot includes complementary edges 29 which mate with edges 27 to provide an interlocking engagement. The base plate 26 is mounted against the jamb 18 by screws 28. The housing slides onto the base plate in a dovetail type mounting engagement. The housing is then secured to the base plate 26 by a cap head fastener (not illustrated). Openings are provided in the base plate 26 to accommodate the mounting screws 28. It should be appreciated that the described mounting configuration may be accomplished without exteriorly visible mounting fasteners.

The front of the housing mounts an exteriorly facing electromagnetic element 30 which mates with a closely positioned armature plate 32 so that upon electrical energization of the electromagnetic element, the armature plate 32 is electromagnetically bonded to the electromagnetic element 30 and hence housing 20. Electromagnetic element 30 and armature plate 32 have generally complementary contact surfaces. Armature plate 32 is therefore mounted to the upper corner of the door 14 so that the armature plate 32 and the electromagnetic element 30 align and are in mutual surface-to-surface contact when the door is in the closed latched position. It should be appreciated that in the doorway configuration illustrated in FIG. 1, the door opens outwardly for egress. Access through the doorway from the secured area is restricted while egress from the interior is automatically controlled and monitored as detailed below. Excepting for the modifications and improvements described herein, electromagnetic lock 22 and armature 32 form an electromagnetic lock unit such as, for example, the electromagnetic lock model 3900 manufactured by Security Engineering Inc., Forestville, Conn., the assignee of the present invention.

The rear of the housing mounts a removable panel 33 (FIG. 3) which preferably functions as the lighted "EXIT" sign. Access to the interior of the housing is ordinarily obtained by removing the rear panel 33. The housing interiorly mounts electronic processing and control circuitry which preferably includes a solid state, fully filtered, dual source, DC-voltage regulator circuit. A portion of the regulated source supplies current requirements for an adjustable voltage to be applied to the electromagnetic element 30 and for remote monitoring or alarm devices as will be further described below. Preferably, the combined current does not exceed 1 amp. In a preferred embodiment, the electromagnetic bonding force between the armature and the electromagnetic element is approximately 1500 pounds. The 1500 pound holding force may be achieved with less than one-fourth amp. of current and a 12 volt direct current input. The other portion of the circuitry supplies current requirements to various components within the system including switching, processing and status monitoring devices as will be more fully described below.

Input power to the circuitry is preferably supplied from an external 110 volt AC step down DC power source (not illustrated) via leads 36 which are received through access openings 39 in the base plate and housing. The input power ranges from 10 to 28 volts AC/DC. The input and output leads connect with a 12 position terminal strip 41 at the housing interior. It will be appreciated that the electromagnetic lock functions so that electrical power applied to the electromagnetic element 30 induces a magnetic bond between the armature plate and the element to essentially lock the door to the frame. An unlocked condition can be efficiently effected by merely removing power to the electromagnetic element.

A push-button switch 31 is located at the underside of the housing in vertical alignment with housing opening 39 for removing power to the electromagnet element in an emergency. Alternately, a key operated switch (not illustrated in FIGS. 1 and 3) in the form of a mortise-type lock may be located at the underside of the housing in place of switch 31 to provide a key controlled switch for resetting the alarm system for the delay mode as described hereinafter. A push button switch 35, or a break glass switch 37 of conventional form may also be mounted on the secured side of the doorway at a location next to the doorway for removing power to the electromagnetic element in an emergency.

The electromagnetic lock system 10 and its numerous features and advantages may best be appreciated by first describing the general operation of the system. With additional reference to FIG. 2A, an acoustical transmitter 40 in the form of an ultrasonic transducer is mounted in the bottom of housing 20 adjacent window 42 to generate an ultrasonic detection beam B and direct the beam B generally vertically toward the doorknob when the door is in the closed position. Transmitter 40 is preferably a modulated retroflective type acoustical transducer. The transducer 40 derives its operating load requirements from the central processing circuitry. Transmitter 40 functions in cooperation with the processing circuitry to generate a detection zone Z in the vicinity of the knob 16.

Figure 2A:
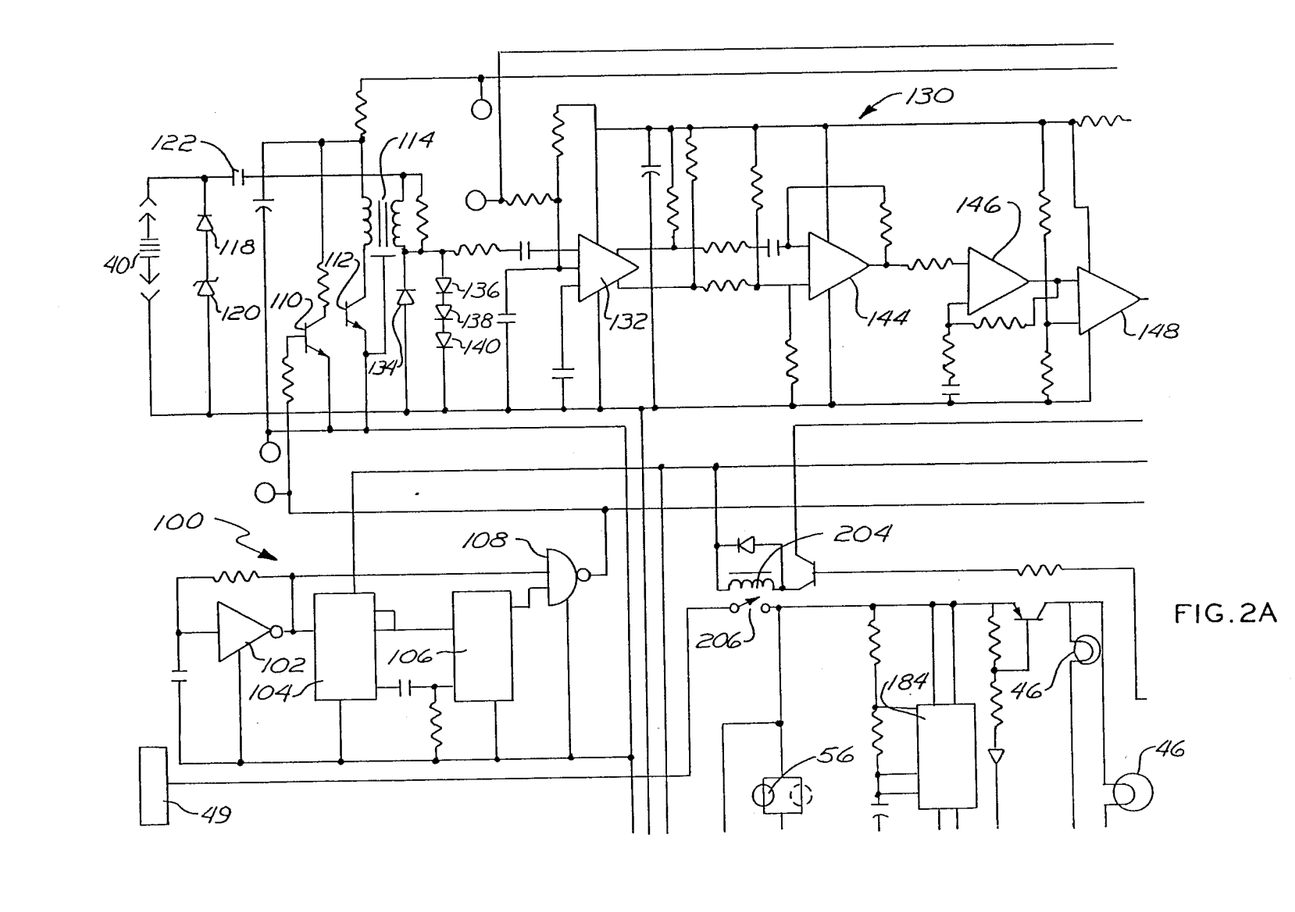
FIGS. 2A, 2B, 2C and 2D are schematic circuit diagrams of the control, processing and signalling system for the electromagnetic lock system of FIG. 1.
Figure 2B:
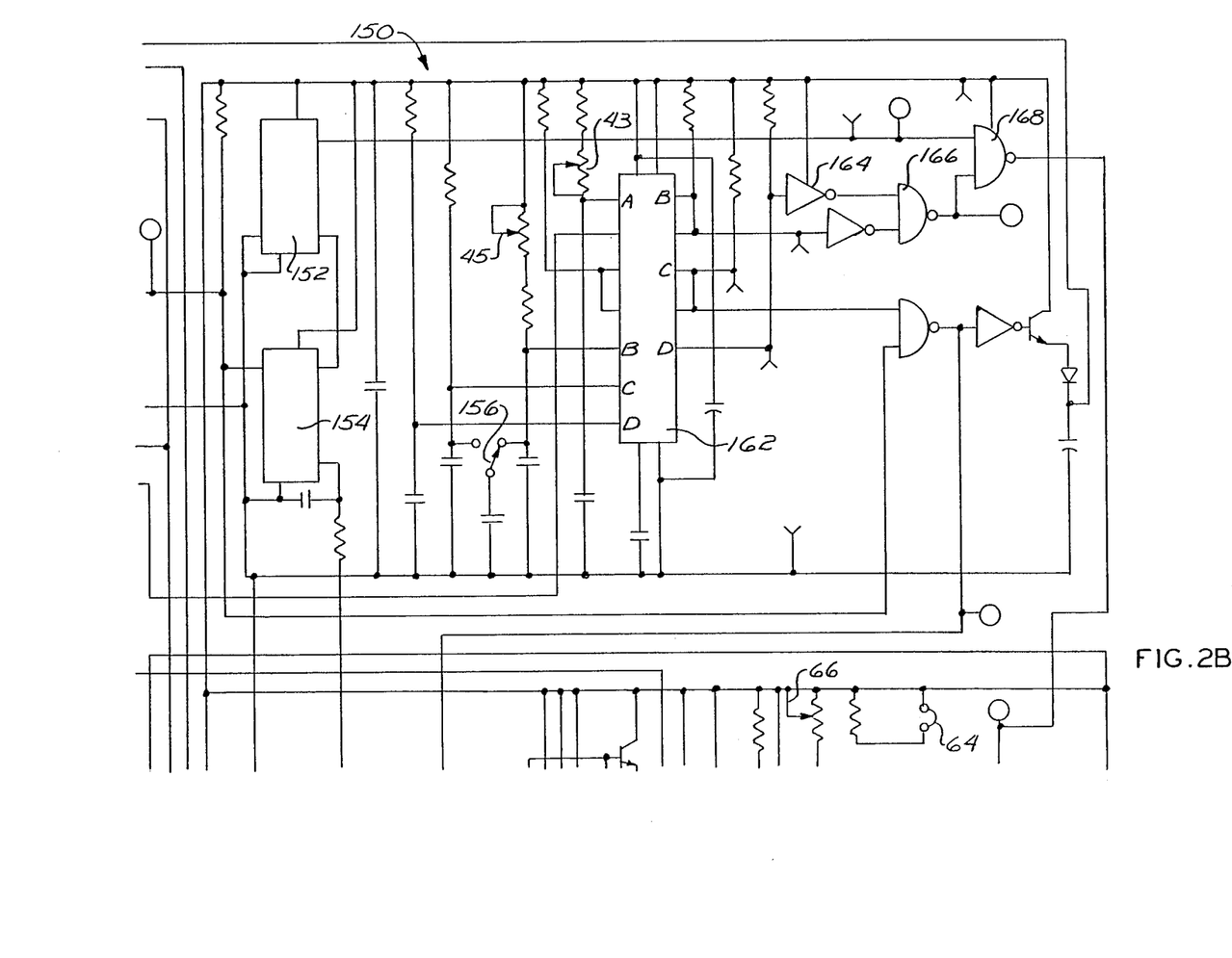

The transducer 40 also functions as an electro-acoustical receiver to receive reflected energy to thereby sense when a foreign object in the form of a human hand or arm is introduced into the detection zone as may occur when a person reaches for the knob. The sensed signal is processed, verified and identified and a presettable timed sequence is initiated by the controller circuitry. If an unlock condition is warranted as determined by the circuitry, negative direct current to the electromagnetic element 30 is removed for a pre-set time interval, thus automatically unlocking the door. In the standard non-emergency mode, the unlocking of the door is accompanied by actuation of an audio alarm 44 at the housing and flashing of the lamps 46 which light the EXIT panel 33. In addition, an electronic latch 48 is actuated to record the unlock condition and various signals indicative of the door status are transmitted to remote station 24.

In the event of power loss or malfunction of the sensor system, a failsafe mode is also automatically implemented to permit egress through the doorway. Such emergency egress is efficiently accomplished by terminating the input electrical power to the electromagnetic element 30. The latter may be accomplished either by emergency supervisory monitors at the remote control station 24 or depressing button 31 at the housing, depressing the local illuminated depressable button of the emergency exit switch 35 or activating the optional emergency break glass switch 37. The break glass switch 37 may be of a conventional form wherein a glass element normally holds a plunger captive. Upon breaking the glass element, the biased plunger is forced outwardly to open a switch. It will be appreciated that the exit button switch 35 and the emergency break glass switch 37 are mounted for access on the hallway side of the housing 20. Switches 35 and 37 are essentially redundant devices. The emergency exit button switch 35 and the emergency break glass switch 37 are connected in series to remove the negative direct current potentials supplied to the electromagnetic element 30.

In the event that the switch 35 or the switch 37 is activated to the open position or the input power to the housing is removed, a battery power supply 49 located remote from the housing supplies sufficient power to maintain the operation of the system. The audio alarm 44 will also be actuated to generate a loud beep noise in the event of power failure. Once activated, the audio alarm 44 continues to audibly indicate that an emergency condition exists until the lock system is reset to the normal non-emergency mode.

Light indicators in the form of light emitting diodes (LEDs) 50, 52, and 54 at the rear or hallway side of the housing 20 provide a visual indication of the locked/unlocked status of the electromagnetic lock. LED 50 emits a green light to indicate that the door is closed and locked. LED 52 emits a red light to indicate that the door is opened. LED 54 emits a yellow light to indicate that the door is closed and unlocked. In addition, LED 54 may function as a service light emitting diode to indicate that there is a system or component failure. An operation lamp 56 directs light downwardly toward the knob or latch hardware from the underside of the housing to insure that the doorway is adequately and properly illuminated. Lamp 56 remains in an illuminated mode regardless of the operational status of the system or the condition of the door.

With reference to FIG. 2, a concealed hermetically sealed magnetic reed proximity switch 60 is mounted in the housing and incorporated into the circuitry to monitor the status of the door. A permanent magnet (not illustrated) is embedded into a nonferrous extension block (not illustrated) which is attached to the armature plate 32. As the door opens, the distance defined between the magnet and the reed switch 60 (proportional to the opening width of the door) exceeds a pre-established proximity range and upon so exceeding the range, the reed switch switches state and consequently transmits an appropriate signal to the central processing unit. An appropriate door status signal may also be transmitted from the central processing circuitry to the remote control station 24. The reed switch 60 is preferably configured to open the switch when the magnet is within the proximity range. When the door is closed as indicated by the reed switch 60, a 12 volt power supply is applied to LED 50. The power supply also energizes the circuitry via diode 62. The door status switch 60 may be adjustable for desired sensitivity and door proximity range and preferably incorporates a micropermanent magnet for positively returning the switch to the normal closed state to prevent actuation by spurious magnetic fields. A preferred reed switch is the DSS model distributed by Security Engineering, Inc., the assignee of the present invention.

A Hall effect sensor 70 which is located within the core of the electromagnetic element 30 is employed to monitor the electromagnetic bond between the electromagnetic element and the armature plate by sensing the strength of the magnetic field between the element and the armature plate. Electronic conditioning of the Hall effect sensor 70 is received from the central processing circuitry. A preferred embodiment of Hall effect sensor 70 is a sensor marketed under the name "TMS-TAM STAT" manufactured and distributed by Security Engineering, Inc., the assignee of the present invention.

Upon actuation of the electromagnetic lock, the Hall effect sensor 70 normally senses the magnetic field and activates a switch for transmitting an appropriate positive operational signal to the processing and control circuitry to light green LED 50 and energize the circuitry via diode 62. In the event that the electromagnetic lock has been tampered with by interposing a non-magnetic insulator between the electromagnetic element 30 and the armature plate 32, the Hall effect sensor switch does not change state to transmit the positive operational signal. If there is a sufficient change in the magnetic field or insufficient field strength, an appropriate caution signal is transmitted to the circuitry and yellow LED 54 is energized. The operational signals are also relayed to the remote control unit 24.

The reed switch 60 and Hall effect sensor 70 are connected in series with the audio alarm 44. In the event that such a tampering has been detected or in the event that the door is placed in an open position beyond an authorized lock release time interval, the pulsating audio alarm 44 will be actuated from the central processing circuitry. A remote security contact output will also switch state at the remote control unit 24.

The light panel 33 may be removed to provide access for manually implementing various adjustments. Ordinarily, the electromagnetic lock is deactuated within less than 0.1 seconds of a deactuating event, e.g., a hand entering the detection zone Z to turn the doorknob. However, in order to comply with a number of building regulations and/or requirements wherein not all egress is authorized, a pre-set time delay may be imposed before the lock is deactuated. An on-board jumper switch 64 may be manually opened to provide a delay made wherein, for example, a 15 second time delay is interposed before the electromagnetic lock is de-energized. The deactuated time interval of the lock is adjustable by means of a potentiometer 66. Typical lock de-energization time intervals before the lock is automatically re-locked range between 0.3 and 30 seconds. The delay interval may allow sufficient time to verify that the egress is authorized and/or to enhance the building security.

The effective detection zone Z of the acoustical sensor is limited to the vicinity of the door knob so that the lock may not be inadvertently deactuated such as by, for example, slipping a letter under the door. Because of the dimensional variations among different doors and the differing door latch actuator configurations, a range adjustment in the form of potentiometer 43 is provided to adjust the range of the effective detection zone of the sensor. The sensitivity of the sensor may be adjusted by angular adjustment of a potentiometer 45 which essentially defines the width or diameter of zone Z. Potentiometers 66, 43 and 45 may each be typically adjusted by means of a screwdriver.

Figure 4:
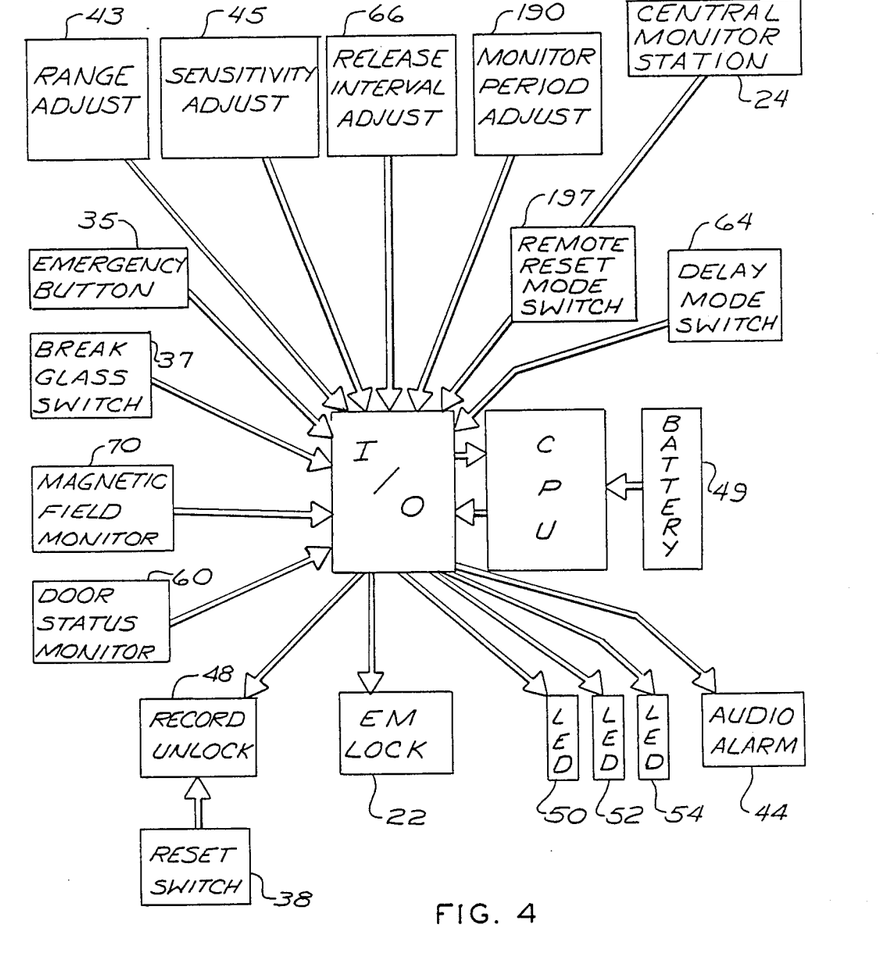
FIG. 4 is a general block diagram of the electromagnetic lock system of FIG. 1.

With reference to FIG. 4 wherein a generalized schematic block diagram of the door lock system 10 is Ilustrated, electronic circuitry comprising an input/output unit and a compact central processing unit is compactly housed within housing 20. The processing unit actuates and deactuates the electromagnetic lock to the lock and unlock modes, respectively, in response to various conditions—both local and remote including signals from the emergency exit and security monitor subsystems and commands from station 24. The status of the electromagnetic lock is locally indicated by LEDs 50, 52 and 54 which are mounted at the housing.

In the non-emergency exit mode, the automatic lock release is ordinarily accomplished by merely reaching for the latch mechanism and thereby moving within the detection zone Z of acoustical sensor 40. The automatic adjustable time delay may be implemented along with a pre-established time release interval for the lock release. The electromagnetic lock may therefore be deactuated after a pre-established delay for a pre-established time interval. The optional automatic delay may be employed for applications such as secured institutions where egress may not be authorized for all individuals within the building. Naturally, appropriate signals are immediately transmitted to the remote station 24 so that the egress may be authorized or appropriate action taken.

The emergency exit sub-system functions to obtain release of the lock in the event that the non-emergency exit sub-system fails or other electrical malfunction. In the emergency exit mode, the housing emergency switch 31, the exit push button switch 35 or the optional break glass switch 37 or a remote control signal may be employed to deactuate the electromagnetic lock by removing negative potential to the electromagnetic element 30. In the emergency exit mode, the audio alarm 44 is also actuated by the processor unit. In the event of electrical power failure, auxiliary power is supplied by a battery power supply 49 which is located remote from the housing.

As previously described, the security monitor subsystem provided by the door lock system is accomplished by means of a door status monitor preferably in the form of a reed proximity switch 60 and an electromagnetic field force monitor preferably in the form of a Hall effect sensor 70. The reed switch and the sensor electrically communicate with the central processor unit. Signals indicative of the door status and indicative of a tamper condition or insufficient field strength in the electromagnetic lock are also relayed to the remote control unit 24. In the event of a tamper condition or a condition wherein the door is released beyond a given time interval, the audio alarm 44 is also actuated. Failure in the monitor system or the processing unit may be visually indicated by means of LED 54 and one or more service indicators (not illustrated). It should be appreciated that a single remote control station may service a plurality of electromagnetic lock/door installations as described above.

Figure 5:
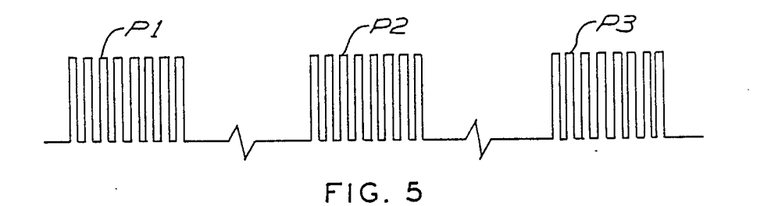
FIG. 5 is a diagrammatical view of a waveform employed in the electromagnetic door lock system of FIG. 1.
Figure 6:
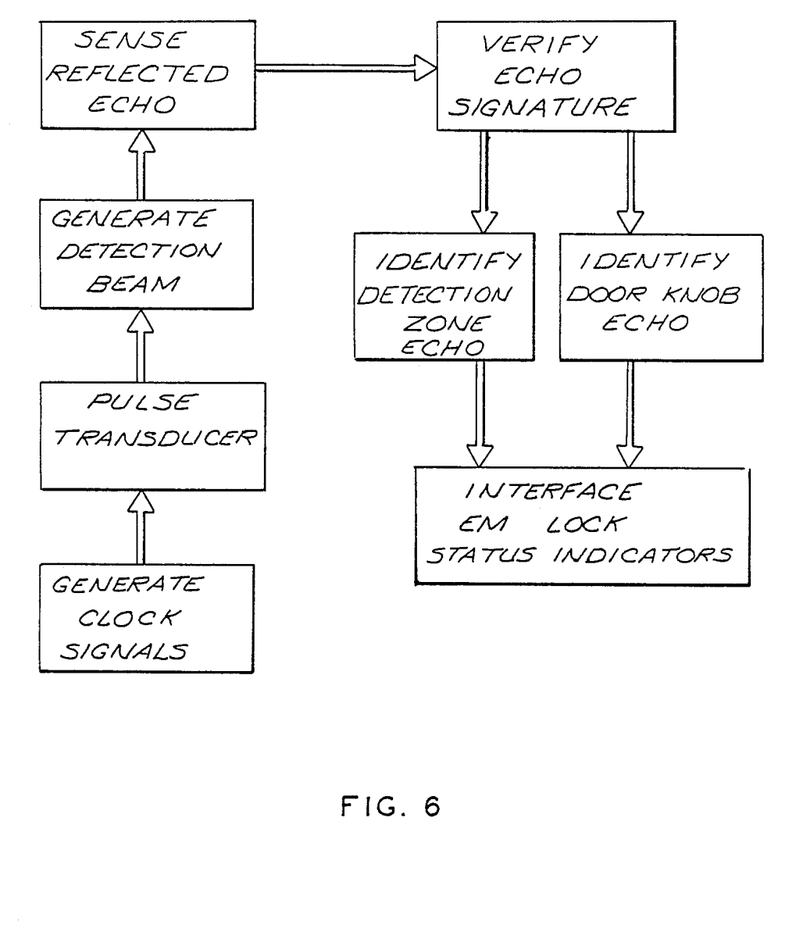
FIG. 6 is a functional block diagram of the detection and processing system for the electromagnetic lock system of FIG. 1.

A general functional block diagram of the detection and processing system is illustrated in FIG. 6. With reference to FIGS. 2A, 2B, 2C and 2D, the detection, processing and signalling circuitry for the electromagnetic lock system is illustrated in schematic form. FIGS. 2A, 2B, 2C and 2D electrically connect in respective clockwise relationship to form the composite schematic circuit diagram for the system. Ultrasonic pulse transmission circuitry for pulsing transducer 40 is designated generally by the numeral 100 in FIG. 2A. A hex Schmitt inverter 102 functions as the master clock generator for the system. The inverter or clock 102 generates an output frequency between 50 Khz and 60 Khz. The pulse train is divided by eight in binary counter 104 and 8,192 in binary counter 106 to derive a pulse gate width and a transmission repetition rate. A quad 2-input NAND gate 108 combines the outputs of clock 102 and counter 104 to synthesize the transmitted ultrasonic wave form to eight cycles of clock frequency in pulse bursts of every 68 to 80 milliseconds. The ultrasonic wave form is amplified by transistors 110 and 112 and applied to the primary windings of transformer 114. Transformer 114 steps up the voltage for driving the ultrasonic transducer 40. In preferred form, ultrasonic transducer 40 is transducer part no. 604029 marketed by Polaroid Corporation, Cambridge, Mass. Zener diodes 118 and 120 regulate the voltage applied to the transducer 40 at 320 volts and rectify some of the energy charging capacitor 122. The acoustic waveform generated by transducer 40 comprises a train of pulse bursts P1, P2, P3 . . . as illustrated in FIG. 5. The pulse bursts function as a signature to identify reflected energy as described hereinafter.

The charged voltage is applied across the transducer so that transducer 40 also operates as an electrostatic sensor for sensing the acoustic signatures of reflected energy in the path of the emitted ultrasonic energy beam B emanating from the transducer. The sensing circuitry is generally designated by the numeral 130 in FIG. 2A. An operational amplifier 132 functions to amplify the return energy signatures from transducer 40 to a voltage level which is sufficient for digital processing of the sensed acoustic signals. The operational amplifier 132 is electrically connected with the transducer 40 via transformer 114. Diodes 134, 136, 138, and 140 are employed to regulate the voltage level applied to the operational amplifier 132 during the time intervals when the transducer 40 is transmitting to thereby prevent damage to the amplifier. During the sensing mode of the transducer, the voltage applied across the input diodes 134, 136, 138 and 140 is less than the level required to drive the diodes into conduction and consequently no diminution of sensed signal strength results. Operational amplifiers 144 and 146 combine with amplifier 132 to provide a stable amplification of the desired frequencies at a level which exceeds 5,000 times the input voltage to amplifer 132. The amplified signal is applied to amplifier 148 which squares the signal into a form suitable for digital processing.

The digital processing circuitry designated generally by the numeral 150 functions to differentiate meaningful sensed acoustic signals from erroneous or inconsequential signals which are generated by objects in the path of the ultrasonic beam B emanating from the transducer 40. The differentiation is essentially a time domain differentiation. The processing circuitry differentiates between learned fixed objects such as the door hardware, i.e. doorknob 16, and transitory objects such as a human hand by generating pre-established digital signals which are temporally related to the ultrasonic signal transmitted by the transducer. A decade counter 152 counts the individual clock cycles in the sensed acoustic signature to verify the validity of the acoustic signature waveform and to eliminate susceptibility to the processing of electrical noise. A dual monostable multivibrator 154 simultaneously verifies the timing of each individual clock cycle which is received by the processing circuitry. In the event that a discrepency is determined, the multivibrator 154 resets the decade counter 152. Therefore, each acoustic signal received by the transducer 40 and converted to electrical waveform for processing by the circuitry is required to be a temporally shifted mirror of the acoustic pulse train transmitted from the transducer or the electrical waveform is ignored by the processing circuitry.

Naturally, means must be provided for accounting for the permanent door hardware fixtures. The hardware fixtures may vary in location in relation to the detecting and processing system from door to door and installation to installation. A switch 156 is selectively actuable between a setup position and a run position. In the normal run position, a narrow zone of insensitivity extends above and below the knob or door hardware to prevent minor mechanical and/or electronic shifts or cyclic variations from being detected as an unlock condition. When the switch 156 is actuated to the setup mode, the zone of insensitivity is reduced to approximately one-half the normal dimension. The reduced zone thereby causes the processing circuitry to be more sensitive to the position of the knob. The potentiometer 43 is selectively adjusted by an installer to precisely reposition the narrow zone into the center of the time position of the signature of the knob until the sensed unlocked condition ceases.

When the switch 156 is actuated to the run mode, the zone of sensitivity expands to the normal size above and below the knob or the hardware to retain the centering provided by the adjustment of potentiometer 43. The second potentiometer 45 is employed to change the dimensions of the insensitivity window in small increments to adjust for the size of the door hardware.

A one-shot quad timer 162 having four monostable oscillators is employed to generate signals that are employed to detect the presence of a signal received from a hand or similar object in the immediate vicinity of the latching hardware of the door, i.e. zone Z, and to disqualify any other undesirable signals. The qualifying function is performed by section A of quad timer 162 which is essentially a 3 input AND gate. Section A of quad timer 162 generates an electrical pulse which is adjusted to approximately 5.5 milliseconds in length and which commences at the inception of the transmitted acoustic burst from the transducer 40. The trailing edge of the pulse from section A triggers section B of the quad timer to generate a pulse of 1.5 milliseconds in duration. The pulse from section B of quad timer 162 functions to accept signatures that occur in the immediate vicinity of the door hardware. Section C of the quad timer 162 is triggered by the pulse generated from section A with a pulse length of approximately 300 microseconds which is also variable. During the time duration of the pulse of section C, the knob signature, i.e. the sensed acoustic energy reflected from the doorknob, is sampled, rectified and integrated and fed to the operational amplifier 132 as an automatic gain adjustment signal. The trailing edge of the pulse from section C triggers section D. Section D has two different durations dependent upon the position of switch 156. In the run mode the width is 200 microseconds, and in the setup mode the width is 100 microseconds within normal component value tolerances. The section D pulse is inverted by amplifier 164 and applied to NAND gate 166 to prevent any subsequent processing of the signature received from the knob itself. NAND gate 168 which receives inputs from NAND gate 166 and counter 152 functions to identify whether or not the sensed acoustic signal is one which properly triggers an unlock condition. A signal indicative of an identified unlock condition is transmitted from NAND gate 168 to a dual oneshot timer 170 (FIG. 2C).

Figure 2C:
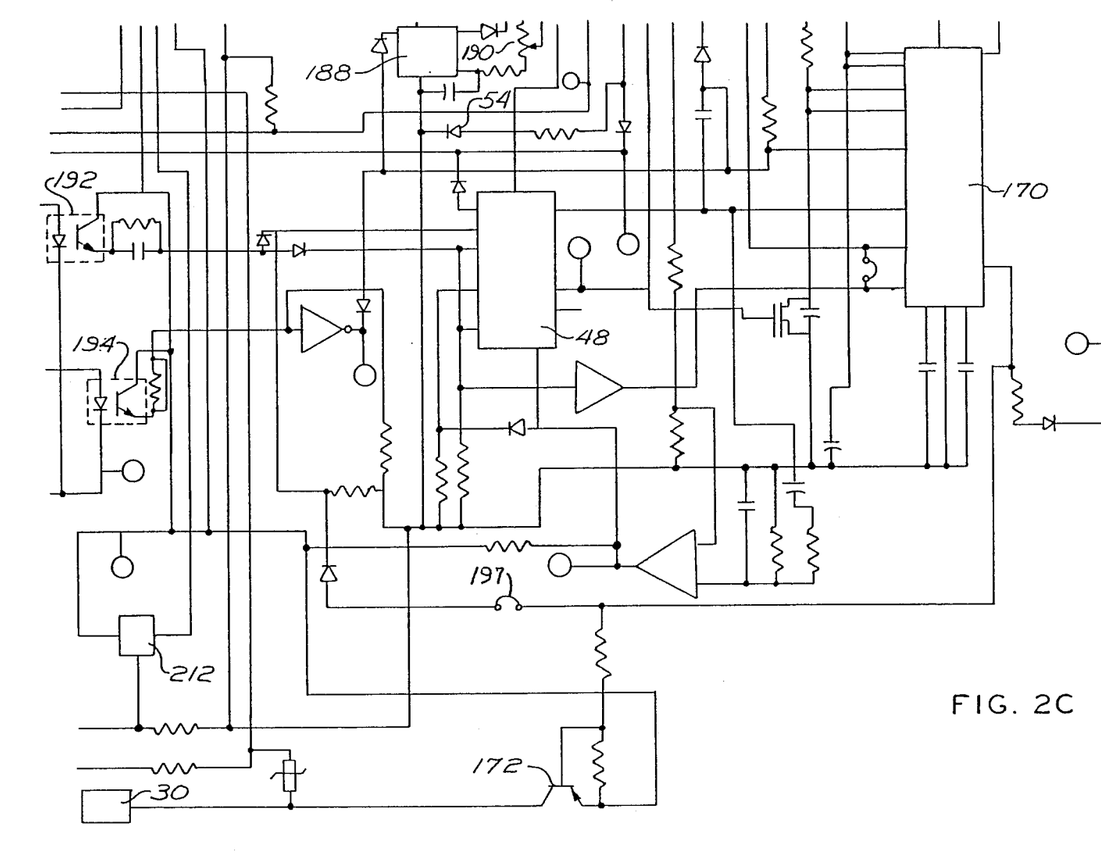

With reference to FIG. 2C, timer 170 generates a fixed signal for a 30-second period duration to deenergize the electromagnetic lock upon application of the detection signal to the timer. The output signal from the dual timer 170 is applied to a driver transistor 172. The driver transistor 172 normally holds the electromagnetic lock in an energized state. Upon generation of the output signal by dual timer 170, the driver transistor 172 is turned off to terminate electrical supply to the electromagnetic lock 30 to thereby unlock the door. It will be appreciated that the system will thus essentially fail in the unlock mode. Under ordinary conditions, the time interval between the sensing of the unlock condition, such as a hand interrupting the transducer beam B to grasp the door knob, and the unlocking of the electromagnetic lock is less than a tenth of a second. The potentiometer 66 (FIG. 2B) may be adjustable by a screwdriver or other means to variably set the unlocking time interval from between 0.3 seconds to 30 seconds before the lock is automatically re-energized.

The mode select switch 64 (FIG. 2B) in the form of a jumper wire may be actuated to impose a 15 second delay on the signal generated from the dual timer 170. Section A of the dual timer generates a pulse which delays the output pulse from the dual timer for 15 seconds to accommodate N.F.P.A. Regulation 101. The foregoing regulation relates to providing a delay in the unlocking of a door for secured buildings such as institutions, etc.

Figure 2D:
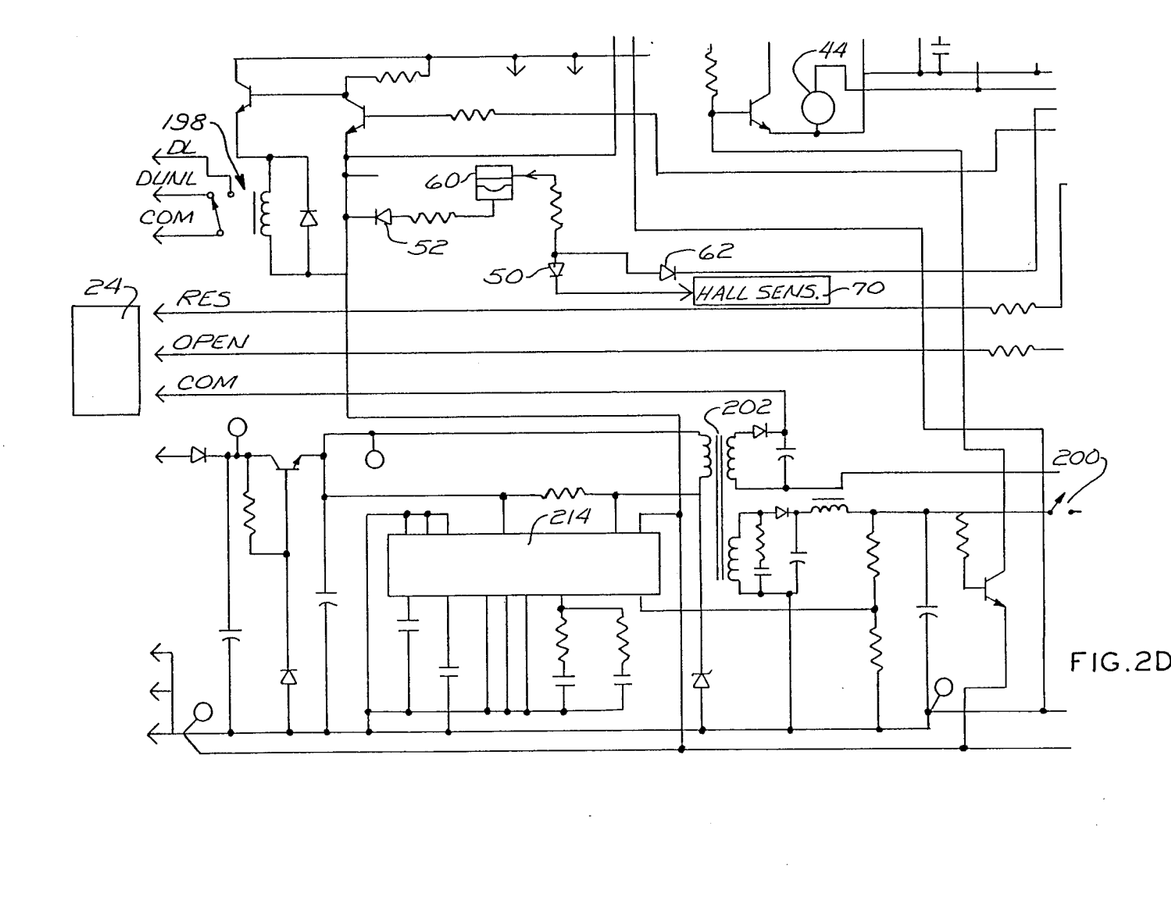

The dual timer 170 also generates an enabling signal which is applied for activating audio alarm 44 (FIG. 2D). In addition, signals are transmitted from the dual timer to activate lamps 46 (FIG. 2A). A 555-type oscillator timer 184 (FIG. 2A) generates intermittent signals for generating a low beeping sound at the audio alarm 44 and a flashing light in lamps 46. Both the alarm 44 and the lamps 46 are mounted in housing 20 for sensory perception in the general vicinity of the doorway. The dual timer 184 also generates a signal which is applied to the dual RS latch 48 which functions to record the door unlocked condition. The latch 48 is actuated to record the unlocked condition until the latch is either reset by a local key switch 38 which may be a mortise lock at the housing or a remote contact closure at station 24 as will be further described below. Section B of the dual latch 48 will automatically latch the electromagnetic lock in an unlock condition for the mode initiated by the on-board jumper switch 64 until reset by the mortise lock 38 or a remote contact closure.

A dual monostable multivibrator 188 generates a wave form for verifying the operation of the system. If the knob echo is not detected for a given time interval, then the audio alarm 44 and the warning lamps 46 are activated and the door is unlocked. A potentiometer 190 may be adjustable to adjust the malfunction monitor period, i.e., the period during which a missing pulse is not detected before the warning alarms and the unlock condition are activated.

Optical isolators 192 and 194 are employed to couple remote reset (RES) and remote open (OPEN) commands from a remote location, such as a central guard station 24, with the sensing and processing circuitry to override the local status at the electromagnetic lock. The optical isolators function to reduce the possibility that externally generated electronic noise will enter the circuitry and create a false operation of the system. A relay 198 has normally open contacts and is adapted for electrical connection with a remote location as a "door unlocked" (DUNL) status indicator. The dual RS latch 48 maintains the condition of the "door unlocked" on the status lines until either reset to the "door locked" (DL) mode by a local key switch or a remote contact closure is effected on the remote reset RES line. An onboard jumper switch 197 is connected to normally provide for local resetting of latch 48. The switch 197 may be cut to implement the remote reset mode as described above.

An anti-tamper switch 200 is normally closed but is opened upon removal of the light panel 33 from the housing 20 to access the circuitry. The anti-tamper switch 200 abuts against the panel 33 and upon removal actuates a remote alarm via an OPEN signal which also unlocks the door.

A high efficiency switching power supply is integrated into the circuitry. Input to the power supply can be either an AC or DC voltage and can vary between 10 and 28 volts AC or DC to maintain proper operation of the system. The output and system operating voltage is preferably 12 volts DC plus or minus 0.25 volts. A secondary winding on an inductor of transformer 202 provides a regulated and isolated six volt power supply to optical isolators 192 and 194. With additional reference to FIG. 2A, a relay 204 is held in an energized state by the system power supply voltage. In the event that the remote power supply ceases, relay 204 is deenergized thereby closing fail-safe switch 206. The battery 49, which is preferably of a 12 volt 1.5 amp per hour form, is then electrically connected to power a loud on-board sounder at the audio alarm 44, to light the lamps 46 for the housing "EXIT" sign and to illuminate the doorway below the mounted housing 20. A bi-positionable lamp 56 is ordinarily mounted in the housing to generate a light and direct the beam toward the bottom of the doorway. A voltage regulator 212 is employed to regulate the voltage for the transmitter. A switching regulator 214 is also employed for regulating the circuitry power supply.

While a preferred embodiment of the electromagnetic lock system of the present invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A method for automatically controlling the operation of an electromagnetic lock which magnetically bonds with an armature for locking a door comprising:
   (a) generating a detection beam from the vicinity of said lock and directing said beam toward a manually operable latch member of the door;
   (b) receiving energy from the general vicinity of said latch member;
   (c) forming a detection zone in the vicinity of said latch member;
   (d) processing the received energy to detect the presence of a foreign object in the detection zone; and
   (e) disabling the electromagnetic lock in the event of the detection of the presence of a foreign object in the detection zone.

2. The method of claim 1 further comprising:
   (f) verifying that the received energy originated in said detection beam.

3. The method of claim 1 further comprising:
   (g) recording the occurrence of a foreign object in the detection zone.

4. The method of claim 1 further comprising:
   (h) enabling the electromagnetic lock prior to step (c), re-enabling the electromagnetic lock after a pre-established time interval, subsequent to step (e).

5. The method of claim 1 further comprising:
   (i) generating a status signal indicative of the lock status of the electromagnetic lock and transmitting the status signal to a location remote from the door.

6. The method of claim 1 further comprising:
   (j) processing the received energy over a pre-established monitor period to determine whether received energy is reflected from said latch member.

7. An electromagnetic lock system adaptable for providing controlled access through a doorway having a frame mounting a door with an armature comprising:
   housing means adapted for mounting to the door frame;
   electromagnetic lock means mounted to said housing means and selectively electrically energizable to magnetically bond with the armature;
   sensor means mounted in said housing means to generate a detection beam for traversal along a path remote from said housing means and to receive reflected energy of said beam;
   processing means mounted in said housing means including means for defining a detection zone in said detection beam path for processing received energy to detect the presence of a foreign object in the detection zone; and
   lock disabling means to automatically prevent energization of said electromagnetic lock means for a pre-established time interval upon detection of the pressure of a foreign object in the detection zone.

8. The electromagnetic lock system of claim 7 wherein the sensor means comprises an acoustical transducer.

9. The electromagnetic lock system of claim 7 further comprising zone defining means for adjustably fixing the location and dimensions of the detection zone.

10. The electromagnetic lock system of claim 7 further comprising an audio alarm means mounted at said housing means for generating an audio alarm in the event that a foreign object is detected in the detection zone.

11. The electromagnetic lock system of claim 7 further comprising record means for automatically recording the occurrence of a detection of a foreign object in the detection zone.

12. The electromagnetic lock system of claim 7 further comprising light indicator means mounted at said housing means for visually indicating the energization status of said electromagnetic lock means.

13. The electromagnetic lock system of claim 7 further comprising remote communication means for transmitting signals indicative of the energization status of the electromagnetic lock means to a location remote from the housing means and receiving input signals from a location remote from the housing means to prevent energization of said electromagnetic lock means.

14. The electromagnetic lock system of claim 7 further comprising time delay means for delaying the actuation of said lock disabling means for a pre-established time interval subsequent to the occurrence of a detection of a foreign object in the detection zone.

15. The electromagnetic lock system of claim 7 further comprising monitoring means to monitor the operation of said processing means by detecting energy reflected from a target outside said detection zone and to prevent energization of said electromagnetic lock means in the event of a malfunction in the processing means operation.

16. The electromagnetic lock system of claim 7 wherein said housing is substantially rectangular with said electromagnetic lock means being positioned at a first side, said sensor means being mounted for transmitting a detection beam through a second side, and a lighted panel being mounted at a third side opposite said first side.

17. The electromagnetic lock system of claim 7 wherein said housing means further comprises a substantially rectangular housing forming a longitudinally extending slot defined by a pair of spaced inclined edges and a base plate having opposed edges complementary with said slot edges is slidably receivable in said slot to form a generally dovetail type interlocking engagement.

18. An automatic electromagnetic lock system comprising:

electromagnetic lock means selectively transformable between a non-energized unlock condition and an energized lock condition for magnetically bonding with an associated armature means;

transmitter means for generating a detection beam and directing said beam generally in the direction of a target;

pulsing means for pulsing said transmitter means so that said detection beam comprises a series of pulse bursts having a pre-established frequency and number of pulses;

receiver means for receiving energy from the general direction of the target;

processor means for converting said received energy into a generally digitized waveform;

clock means for generating a zone signal having a pre-established time duration and a pre-established time relationship with a pulse of said detection beam so as to form a detection zone in the vicinity of said target;

identifier means for identifying waveforms having a pre-established time relationship with the transmitted pulse bursts and occurring at a time defined by said zone signal and generating an identification signal indicative of the presence of an object in the detection zone and;

lock disabling means responsive to said identification signal for automatically transforming said electromagnetic lock means to an unlock condition for a pre-established time interval.

19. The electromagnetic lock system of claim 18 wherein the transmitter means comprises an acoustical transducer.

20. The electromagnetic lock system of claim 18 further comprising a pre-identification means for verifying that the received energy originated in said detection beam, said pre-identification means comprising counting means for counting the number of pulses in said waveform and frequency verification means for verifying that the pulses in said waveform occur at a pre-established frequency.

21. The electromagnetic lock system of claim 20 wherein the identifier means further identifies waveforms having a pre-established relationship between the number and frequency of pulses in said waveform and the transmitted pulse burst.

22. The electromagnetic lock system of claim 18 further comprising recording means for recording the occurrence of an identification signal.

23. The electromagnetic lock system of claim 18 wherein the disabling means comprises delay means for delaying transforming said lock means to an unlock condition for a pre-established delay interval.

24. The electromagnetic lock system of claim 18 for variably adjusting the duration and detection beam pulse relationship of said zone signal.

25. The electromagnetic lock system of claim 18 wherein said disabling means is further responsive to a remote input signal for transforming said electromagnetic lock means to an unlock condition.

26. The electromagnetic lock system of claim 18 further comprising an audio alarm means for generating an audio alarm in response to said identification signal.

27. The electromagnetic lock system of claim 18 further comprising a light display means for producing a visual display light indicative of the lock condition of the electromagnetic lock means.

28. The electromagnetic lock system of claim 18 further comprising safety means for comparing the pulses of said waveform with pre-established pulse characteristics and transforming the lock means to an unlock condition in the event that the pulses do not satisfy said characteristics within a pre-established safety time period.

* * * * *